US012711277B1

(12) United States Patent
Bhargava

(10) Patent No.: US 12,711,277 B1
(45) Date of Patent: Aug. 18, 2026

(54) METHODS, SYSTEMS, AND COMPUTER READABLE MEDIA FOR IMPLEMENTING USER AUTHORIZATION IN CLOUD APPLICATIONS

(71) Applicant: Keysight Technologies, Inc., Santa Rosa, CA (US)

(72) Inventor: Arpit Bhargava, Gurugram (IN)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 229 days.

(21) Appl. No.: 18/133,340

(22) Filed: Apr. 11, 2023

(51) Int. Cl.
*G06F 21/62* (2013.01)
*H04L 9/40* (2022.01)

(52) U.S. Cl.
CPC ........ *G06F 21/629* (2013.01); *H04L 63/0807* (2013.01); *H04L 63/102* (2013.01); *H04L 63/104* (2013.01)

(58) Field of Classification Search
CPC . G06F 21/629; H04L 63/0807; H04L 63/102; H04L 63/104
See application file for complete search history.

(56) References Cited

U.S. PATENT DOCUMENTS 8,789,157 B2 7/2014 Sinn
9,418,216 B2 8/2016 Wetter et al.
9,660,999 B2 5/2017 Wolman et al.
9,742,780 B2 8/2017 Junuzovic et al.
10,044,723 B1 * 8/2018 Fischer ................. H04L 63/102
10,051,455 B2 8/2018 Jeng et al.
10,291,477 B1 5/2019 Askar
10,454,940 B2 10/2019 Lander et al.
10,645,073 B1 5/2020 Agarmore et al.
10,904,749 B2 1/2021 Circosta et al.
10,979,299 B1 4/2021 Askar
12,495,034 B1 12/2025 Goldstein et al.
2007/0282800 A1 * 12/2007 England ................ G06F 21/604
2010/0242084 A1 9/2010 Keeni
(Continued)

FOREIGN PATENT DOCUMENTS

WO 2022271957 12/2022

OTHER PUBLICATIONS

Commonly-Assigned, co-pending U.S. Appl. No. 18/135,722 for "Methods, Systems and Computer Readable Media for Providing a Distributed Infrastructure" (Unpublished, filed Apr. 17, 2023).
(Continued)

*Primary Examiner* — Abdulkader M Alriyashi

(57) ABSTRACT

A method for implementing user authorization in cloud applications includes receiving a user token at a sub-authorization computing device from a user interface of a cloud application, and in response to a user login event. The sub-authorization computing device queries, using the user token, an identity provider for authorization status of a first user for the cloud application. The sub-authorization computing device receives from the identify provider an indication of authorization status of the first user to access at least one feature of the cloud application. First feature access data for the first user is determined using the indication of the authorization status of the first user and a feature map of the cloud application. The sub-authorization computing device sends the first feature access data to the user interface of the cloud application.

18 Claims, 11 Drawing Sheets

700

(56) References Cited

U.S. PATENT DOCUMENTS

| | | | | |
|---|---|---|---|---|
| 2014/0081893 | A1 | 3/2014 | Modha | |
| 2015/0347738 | A1 | 12/2015 | Ulrich et al. | |
| 2017/0075677 | A1 | 3/2017 | Gross et al. | |
| 2018/0302391 | A1* | 10/2018 | Jones | G06F 16/284 |
| 2019/0020659 | A1* | 1/2019 | Loni | H04L 63/105 |
| 2022/0043893 | A1* | 2/2022 | Goecke | G06F 21/629 |
| 2022/0269801 | A1* | 8/2022 | Hua | H04L 63/102 |
| 2023/0068836 | A1 | 3/2023 | Koban | |

OTHER PUBLICATIONS

Han, et al., "Semantic service provisioning for smart objects: Integrating IoT applications into the web", Future Generation Computer Systems, 76 (2017) 180-197.

Non-Final Office Action for U.S. Appl. No. 18/135,722 (Apr. 4, 2025).

Notice of Allowance for U.S. Appl. No. 18/135,722 (Aug. 6, 2025).

* cited by examiner

```
export const features: IPermission[]     = {
    manageStationGroups: {
        scope: 'Manage',
        resource: 'Station Groups'
    },
    installRelease: {
        scope: 'Install',
        resource: 'Release'
    },
    publishRelease: {
        scope: 'Publish',
        resource: 'Release'
    },
    deleteRelease: {
        scope: 'Delete',
        resource: 'Release'
    },
    manageDeviceTypes: {
        scope: 'Manage',
        resource: 'DeviceTypes and StationTypes'
    },
    addStation: {
        scope: 'Add',
        resource: 'Stations'
    },
    editStation: {
        scope: 'Edit',
        resource: 'Stations'
    },
    deleteStation: {
        scope: 'Delete',
        resource: 'Stations'
    }
};
```

302

304

306

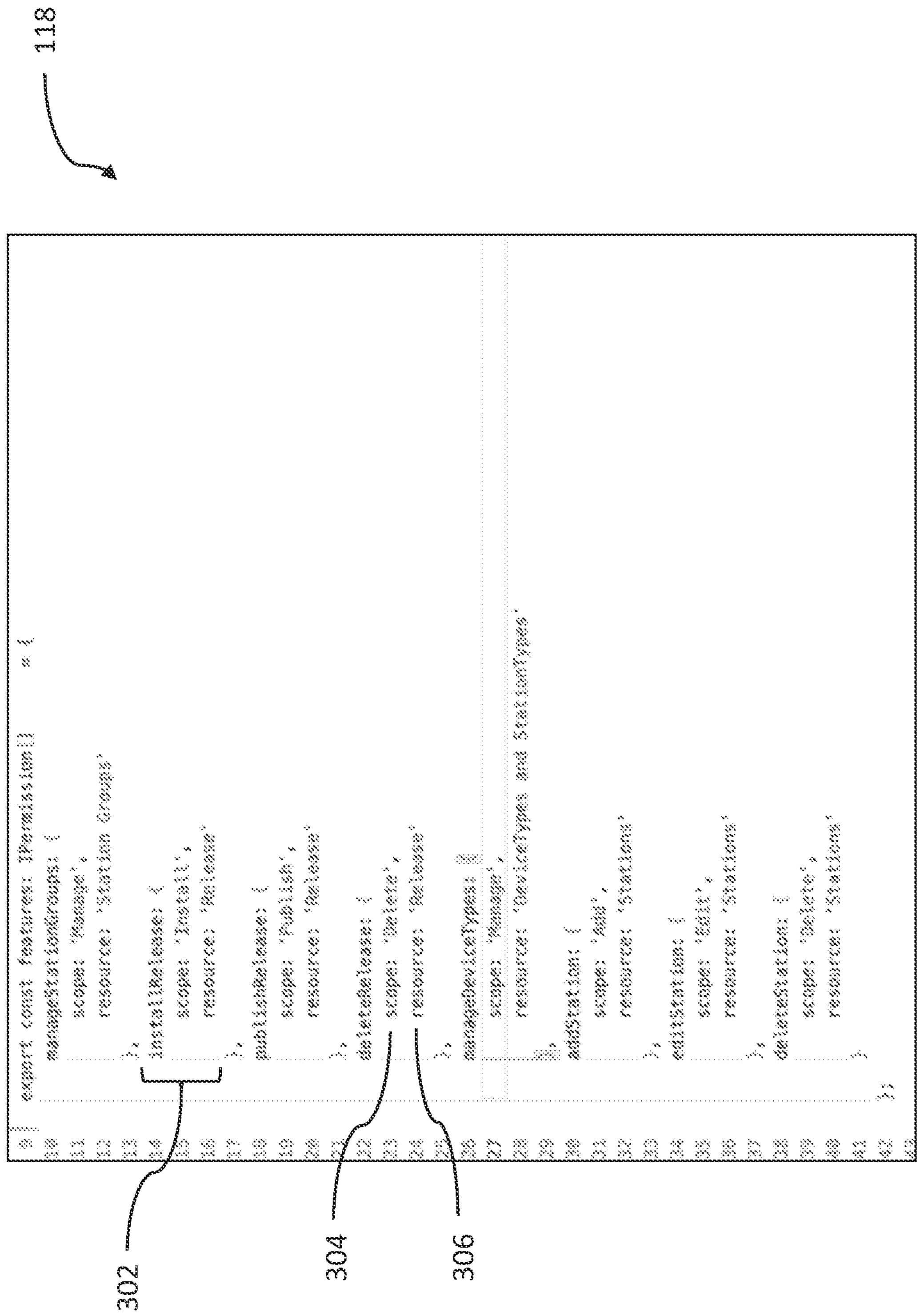

FIG. 3

METHODS, SYSTEMS, AND COMPUTER READABLE MEDIA FOR IMPLEMENTING USER AUTHORIZATION IN CLOUD APPLICATIONS

TECHNICAL FIELD

The subject matter described herein relates to user authorization for applications. More specifically, the subject matter relates to methods, systems, and computer readable media for implementing user authorization in cloud applications.

BACKGROUND

User authorization ensures that users accessing a cloud application have proper authorization for the requested access. However, user authorization management is not consistently configured across cloud applications, often requiring unique solutions for each application. Cloud applications may also use various identity providers and maintaining user authorization can be tedious and difficult to adjust.

There is a need for a generic management of user authorization to readily implement among cloud applications. There is also a need to easily manage permissions to various features offered by a cloud application among different groups of customers, such as for beta testing or to implement tiered payment packages.

SUMMARY

Methods, systems, and computer readable media for implementing user authorization in cloud applications are disclosed. An example method for implementing user authorization in cloud applications includes receiving a user token at a sub-authorization computing device from a user interface of a cloud application, and in response to a user login event. The method further includes querying, by the sub-authorization computing device and using the user token, an identity provider for authorization status of a first user for the cloud application. The method further includes receiving, at the sub-authorization computing device from the identify provider, an indication of authorization status of the first user to access at least one feature of the cloud application. The method further includes determining, by the sub-authorization computing device, first feature access data for the first user using the indication of the authorization status of the first user and a feature map of the cloud application, the first feature access data being configured to cause the user interface of the cloud application to display at least one graphical element for enabling the first user to access the at least one feature of the cloud application. The method further includes sending, by the sub-authorization computing device to the user interface of the cloud application, the first feature access data.

An example system for implementing user authorization in cloud applications includes a processor, a memory communicatively connected to the processor, and a sub-authorization computing device implemented using the processor and the memory. The sub-authorization computing device is configured for receiving, from a user interface of a cloud application, and in response to a user login event, a user token. The sub-authorization computing device is further configured for querying, using the user token, an identity provider for authorization status of a first user for the cloud application. The sub-authorization computing device is further configured for receiving, from the identify provider, an indication of authorization status of the first user to access at least one feature of the cloud application. The sub-authorization computing device is further configured for determining first feature access data for the first user using the indication of the authorization status of the first user and a feature map of the cloud application, the first feature access data being configured to cause the user interface of the cloud application to display at least one graphical element for enabling the first user to access the at least one feature of the cloud application. The sub-authorization computing device is further configured for sending the first feature access data to the user interface of the cloud application.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

BRIEF DESCRIPTION OF THE DRAWINGS

The subject matter described herein will now be explained with reference to the accompanying drawings of which:

FIG. 3 shows an example feature map according to an embodiment of the presently disclosed subject matter;

DETAILED DESCRIPTION

The subject matter described herein includes methods, systems, and computer readable media for implementing user authorization in cloud applications. A user interface for a cloud application may generate a user token, such as a JavaScript Object Notation (JSON) web token (JWT), from a login event by a user. A sub-authorization computing device may receive the user token and determine what features of the cloud application the user is authorized to access by requesting authorization status of the user from an identity provider for the cloud application. The sub-authorization computing device may receive the authorization status of the user and determine which features of the cloud application the user is permitted to access by referring to a feature map of the cloud application, which lists the features of the cloud application. The sub-authorization computing device may generate feature access data that identifies which of the features the user is permitted to access. The user interface may receive the feature access data and generate a display for the user with graphical elements for the features the user is authorized to access, while hiding graphical elements for the features the user is not permitted to access.

Cloud application developers can easily and quickly introduce authorization to their applications. The sub-authorization computing device provides a simplified and generic way for an administrator to manage and secure user authorization for various features among different cloud applications. By creating the feature map, assigning one or more roles to users, and determining which features each role may access, an administrator can easily control the features different groups of users are authorized to use and automate display adjustments on the user interface accordingly.

Figure 1:
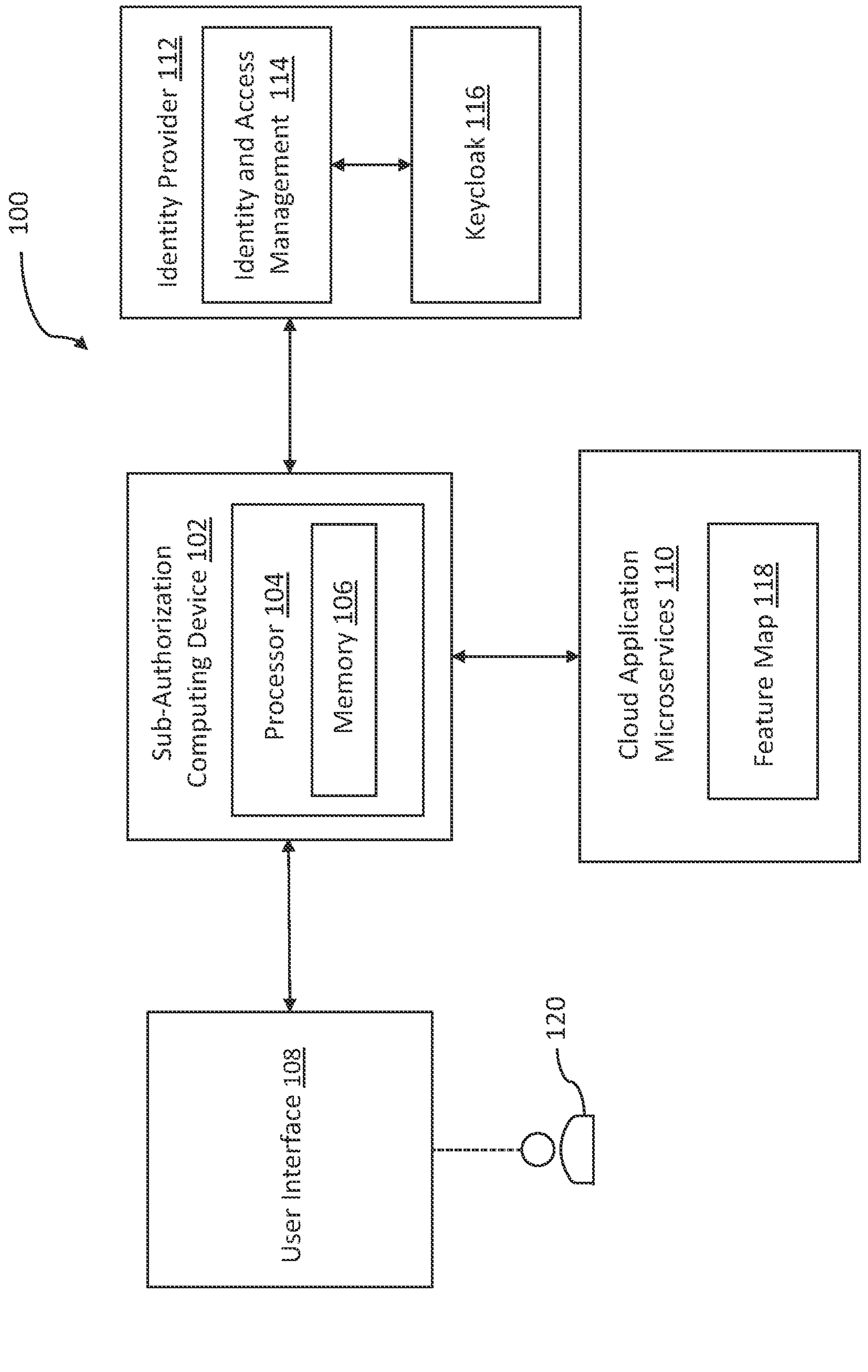
FIG. 1 is a block diagram illustrating an example system for implementing user authorization in cloud applications according to an embodiment of the presently disclosed subject matter.

FIG. 1 is a block diagram illustrating an example system 100 for implementing user authorization in cloud applications. System 100 may include a sub-authorization computing device 102 with at least one processor 104 and memory 106. Sub-authorization computing device 102 may include, without limitation, a microcontroller, microprocessor, digital signal processor (DSP) and/or system on a chip (SoC) as described herein. Sub-authorization computing device 102 may communicate with a mobile device such as a mobile telephone or smartphone. Sub-authorization computing device 102 may include a single computing device operating independently, or may include two or more computing devices operating in concert, in parallel, sequentially or the like; two or more computing devices may be included together in a single computing device or in two or more computing devices. Sub-authorization computing device 102, using processor 104 and memory 106, may be configured to perform any of the steps described herein.

System 100 includes a user interface 108 of a cloud application. User interface 108 may be configured to receive login credentials from a user 120 to access the cloud application. User interface 108 may generate a user token in response to a user login event, such as when user 120 inputs login credentials in the user interface 108. The user token may include a registered or custom JavaScript Object Notation (JSON) web token (JWT) such as an ID token. The user token may include an indication of user's 120 identity, username, email address, credentials, password, and/or the like. The user token may identify a level of authorization or role assigned to user 120 as described herein, for example, that the user 120 logged in as a customer or subscriber to the cloud application, an application engineer, an administrator, or the like. Sub-authorization computing device 102 may receive the user token from user interface 108. In some embodiments, user interface 108 may be configured to send the user token to cloud application microservices 110 and sub-authorization computing device 102 may intercept the user token to verify the authorization of user 120 before the user 120 has access to the cloud application. Cloud application microservices 110 may include a backend of the cloud application with one or more microservices on one or more servers. Cloud application microservices 110 may each independently provide services to implement the cloud application and communicate among each other via one or more application programming interfaces (APIs). Sub-authorization computing device 102 may intercept traffic from user interface 108 to cloud application microservices 110 and identify the user token among the intercepted traffic. In some embodiments, sub-authorization computing device 102 may intercept all requests from user interface 108 to cloud application microservices 110. In other embodiments, sub-authorization computing device 102 may intercept all traffic from user interface 108 to cloud application microservices 110. In some embodiments, user interface 108 may be configured to send the user token to sub-authorization computing device 102 instead of cloud application microservices 110. User interface 108 may send the user token to sub-authorization computing device 102 or cloud application microservices 110 with a request for a list of features that user 120 is authorized to access. User interface 108 may use Hypertext Transfer Protocol (HTTP) or Hypertext Transfer Protocol Secure (HTTPS) to communicate with sub-authorization computing device 102 and/or cloud application microservices 110.

Sub-authorization computing device 102 is configured to query an identity provider 112 for authorization status of user 120 for the cloud application using the user token. In some embodiments, sub-authorization computing device 102 sends the user token to identity provider 112 for authorization status. In other embodiments, sub-authorization may pull information from the user token and may send at least a portion of the pulled information to identity provider 112. The query from sub-authorization computing device 102 to identity provider 112 may include a REST API call to access authorization status. The query from sub-authorization computing device 102 to identity provider 112 may include a IsUserAuthorizedToAccessFeature(IPermission) request. Identity provider 112 may be configured to create, store, and manage digital identities and authenticate user 120 for cloud applications. Identity provider 112 may include identity and access management 114. Identity and access management 114 may include a set of processes, policies, and tools for defining and managing roles and access privileges of individual network entities, e.g., users and/or devices, to cloud applications. Identity and access management 114 can be configured to accept login credentials for selected third party applications such as email or social media applications. Identity and access management 114 can be configured to determine a level of required authentication, for example multi-factor authentication. The cloud application, including cloud application microservices 110, does not store user's 120 information, which provides additional security for maintaining confidentiality of the user's 120 information.

It is understood that system 100 may include a plurality of cloud applications implemented on corresponding cloud application microservices 110 and each cloud application accessible to users 120 with a distinct user interface 108 of the cloud application. The cloud applications may utilize various identity providers 112. Sub-authorization computing device 102 may intercept the user tokens created by login events for the cloud applications and query identity providers 112 corresponding to the cloud applications for authorization status of users 120. In some embodiments, identity and access management 114 may implement a service configured for providing a central point of user authorization management for the various identity providers 112 used by the cloud applications, such as Keycloak 116. Keycloak 116 can unify information from identity providers 112 using different protocols including security assertion markup language (SAML), lightweight directory access protocol (LDAP), single sign-on (SSO), and open authorization 2.0 (OAuth2). Keycloak 116 can be configured for login with social networks. In embodiments implementing keycloak 116, sub-authorization computing device 102 may query identity and access management 114 and/or keycloak 116 of identity providers 112, and identity and access management 114 and/or keycloak 116 may respond with an indication of the authorization status of user 120.

Sub-authorization computing device 102 receives from identity provider 112 an indication of authorization status of user 120 to access at least one feature of the cloud application. The response from identity provider 112 may include a response to the IsUserAuthorizedToAccessFeature (IPermission) request. Each feature of the cloud application may include at least one resource of the cloud application and at least one scope of access to the corresponding at least one resource. As a non-limiting example, a resource may include a list such as station groups or employee lists, a beta program, or users and roles. A scope may include an action to perform on a resource such as view, edit, delete, add, publish, install, or release. Thus, exemplary features may include adding station groups, viewing employee lists, releasing a beta program, or editing users and roles. The indication of authorization status may identify the features available on the cloud application that user 120 is authorized to access. The indication of authorization status may also identify features of the cloud application that user 120 is not authorized to access.

Sub-authorization computing device 102 is configured to determine feature access data for user 120 using the indication of the authorization status of the user 120 and a feature map 118 of the cloud application. Feature map 118, shown in FIG. 3, lists the features, with their scope and resource, of the cloud application. Each cloud application may have feature map 118 that is unique according to the features offered by each cloud application. A custodian of the cloud application, such as an administrator, may create or edit feature map 118. Sub-authorization computing device 102 may retrieve feature map 118 from cloud application microservices 110. In some embodiments, feature map 118 may be uploaded to sub-authorization computing device 102. After user 120 logs into a cloud application, sub-authorization computing device 102 may pull feature map 118 of that cloud application. Sub-authorization computing device 102 may determine the feature access data for user 120 by identifying features of the cloud application in feature map 118 and associating the features in the feature map 118 with the corresponding features in the indication of the authorization status of the user 120 from identity provider 112 and, therefore, determining the authorization status of the user 120 for each feature in the feature map 118. The feature access data may include an indication of which features of the features offered by the cloud application user 120 is authorized to access. The feature access data is configured to cause user interface 108 of the cloud application to display at least one graphical element for enabling user 120 to access the at least one feature of the cloud application. Graphical elements may include, for example, listed items of a resource for user 120 to view the resource, a text box to add or edit a resource, a delete button to remove a selected item in a resource, a button to upload a resource, and the like. Graphical elements for features that user 120 is not authorized to access may be hidden to the user 120.

Figure 6:
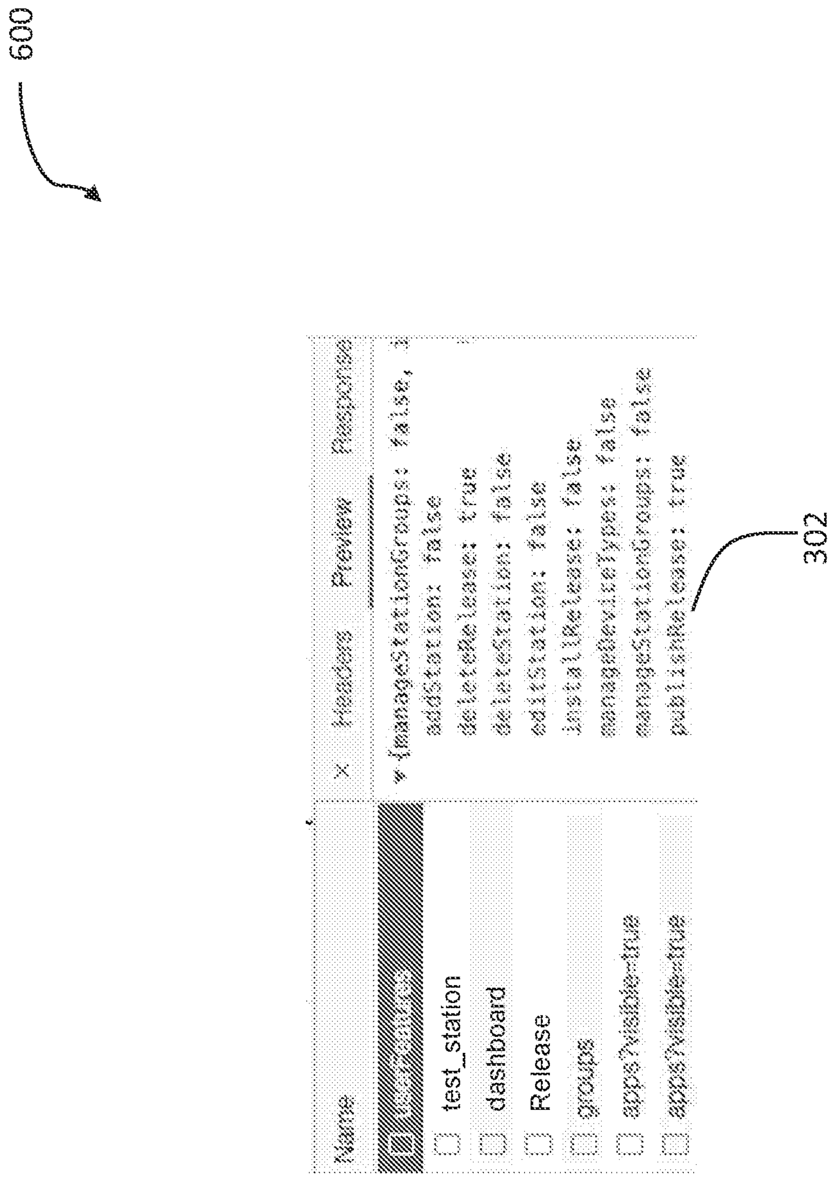
FIG. 6 shows example feature access data according to an embodiment of the presently disclosed subject matter.

Sub-authorization computing device 102 then sends the feature access data, as shown in FIG. 6, to user interface 108 of the cloud application. User interface 108 may consume the feature access data to determine the display of graphical elements. User interface 108 may hide graphical elements for features that user 120 does not have permission to access or the user interface 108 may still show the graphical elements in a different format, such as in a light grey color, to distinguish for the user 120 the features that are off limits. Using the feature access data, user interface 108 may show graphical elements for the features that user 120 is authorized to access. Sub-authorization computing device 102 may send feature access data for various users 120 to the cloud application 120 that sent the user token. When user 120 accesses the cloud application from an API as described herein, bypassing user interface 108, sub-authorization computing device 102 may permit the API to access the feature access data at the API endpoint.

Sub-authorization computing device 102 may be configured to change the authorization status of user 120 to access features of the cloud application based on administrator instructions. In some embodiments, the administrator instructions may be independent of authorization status of the user stored in identity provider 112. Sub-authorization computing device 102 may store authorization instructions from an administrator and verify after a login event and/or after user 120 requests access to a feature of the cloud application the user's 120 access based on the stored administrator instructions. Sub-authorization computing device 102 may send to identity provider 112 an updated authorization status of user 120 based on the received administrator instructions so future authorization status checks of the user 120 by the identity provider 112 will be based on the updated authorization status.

Different users 120 may have different authorizations. A first of users 120 may have authorization to access a first group of features and a second of users 120 may have authorization to access a second distinct group of features. Sub-authorization computing device 102 may receive a first indication of authorization status for the first of users 120 and a second distinct indication of authorization status for the second of users 120 from identity provider 112. Based on the first and second indications of authorization statuses, sub-authorization computing device 102 may generate corresponding and distinct first and second feature access data, which user interface 108 may use to generate first graphical elements for the first of users 120 and distinct second graphical elements for the second of users 120.

Figure 2:
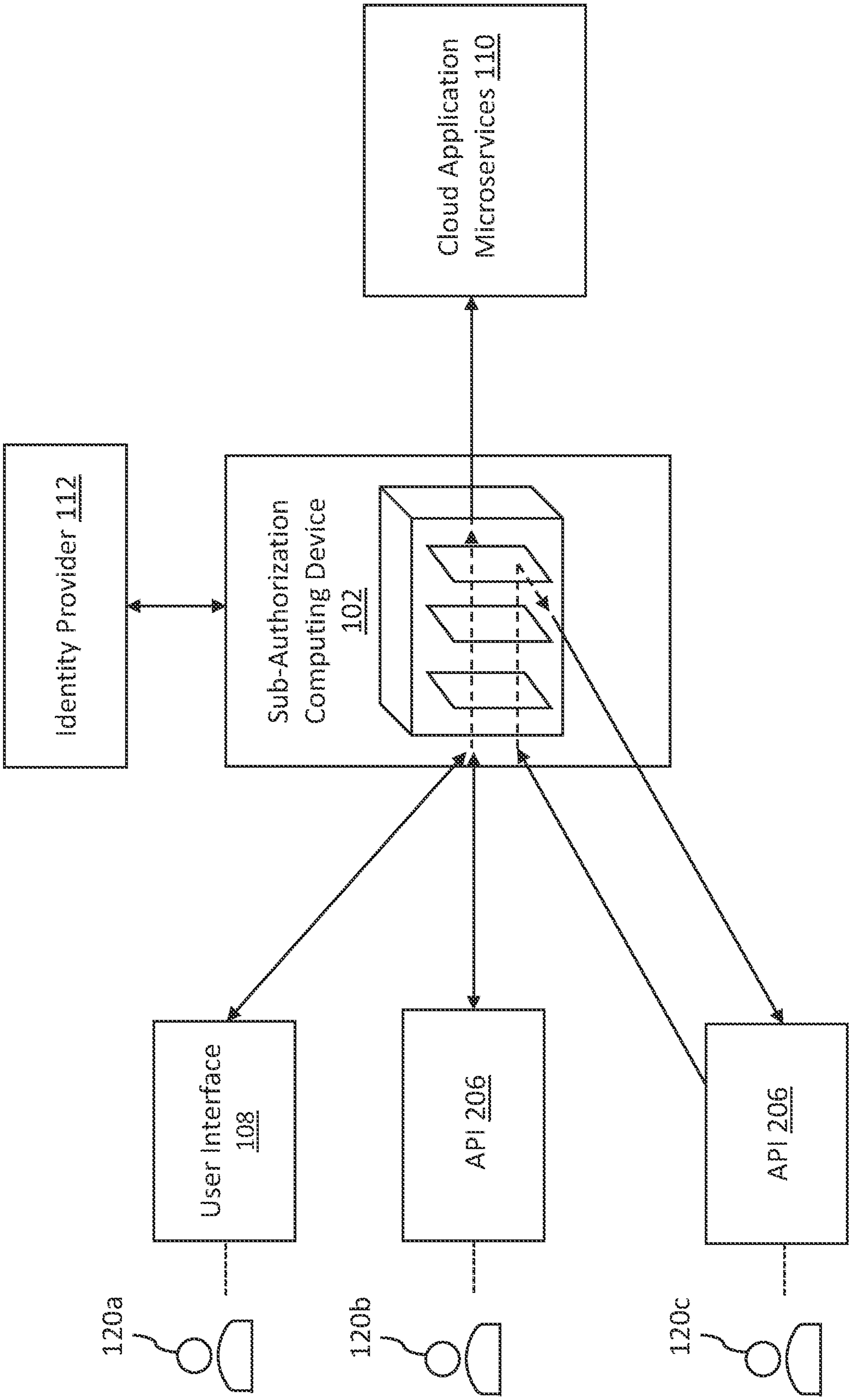
FIG. 2 is a block diagram illustrating aspects of an example system for implementing user authorization in cloud applications according to an embodiment of the presently disclosed subject matter.

FIG. 2 is a block diagram illustrating cloud application traffic. As shown in FIG. 2, a user 120*a* may request to access a feature of the cloud application from user interface 108 of the cloud application, which then uses an API (not shown) to communicate with cloud application microservices 110. Alternatively, users 120*b*, 120*c* may request to access a feature of the cloud application directly from an API 206. When attempting to access features of the cloud application directly from an API, bypassing user interface 108 and a login event, users 120*b*, 120*c* may receive a user token from identity provider 112 that is not necessarily for a user with the requisite authorization to access features of the cloud application. Therefore, sub-authorization computing device 102 may verify a user's authorization status in response to receiving a request from the user to access a feature of the cloud application. FIG. 2 shows an authorized user 120*b* requesting to access a feature of the cloud application directly from API 206. Sub-authorization computing device 102 may intercept the request and determine that user 120*b* is authorized to access the feature and pushes the request to cloud application microservices 110. Sub-authorization computing device 102 may implement a centralized logic. The centralized logic may include reading feature map 118, shown in FIG. 1, matching the requested feature to a corresponding feature listed in feature map 118, and retrieving a resource and scope in the matched feature. Sub-authorization computing device 102 may implement centralized logic to retrieve from identity provider 112 the authorization status using the user token and the matched feature, such as the resource and scope of the matched feature, in feature map 118. The centralized logic to communicate with identity provider 112 can readily be extended by cloud application administrators.

FIG. 2 also shows an unauthorized user 120*c* requesting to access a feature of the cloud application directly from API 206. Sub-authorization computing device 102 intercepts the request and, using the centralized logic, determines that user 120*b* is not authorized to access the requested feature and denies the access by preventing the request from being sent to cloud application microservices 110. In some embodiments, sub-authorization computing device 102 may return a notification to unauthorized user 120*c* stating that the request is denied, which may indicate that the user 120*c* does not have access to access the requested feature. In some embodiments, sub-authorization computing device 102 verifies a user's authorization status in response to a request to access a feature of the cloud application only if the feature is not permitted to all users. Upon receiving a request from user 120 to access a feature, sub-authorization computing device 102 may determine whether the feature to prohibited to any user and, if so, then verify the user's authorization to access the feature. Sub-authorization computing device 102 may query identity provider 112 to determine whether the user is authorized to access the feature.

FIG. 3 shows an example feature map 118 for the cloud application. Feature map 118 lists features 302 of the cloud application including a scope 304 and a resource 306 of each feature 302. In this illustrated example, feature map 118 includes feature 302 installRelease with scope 304 install and resource 306 release for user 120 to install a file for release in the cloud application. A custodian of a cloud application may create and edit feature map 118 for the cloud application. If features offered by the cloud application change, the custodian can edit feature map 118 accordingly. For example, if a new feature is being tested and rolled out to a select group of users 120, the custodian can add the new feature to the feature map 118 and add authorization for the select users 120 to access the new feature. A custodian can simply add a new feature to feature map 118 for authorization for the new feature to be included in the cloud application. Once added to feature map 118 a custodian can manage access to the new feature among users as described herein.

Figure 4A:
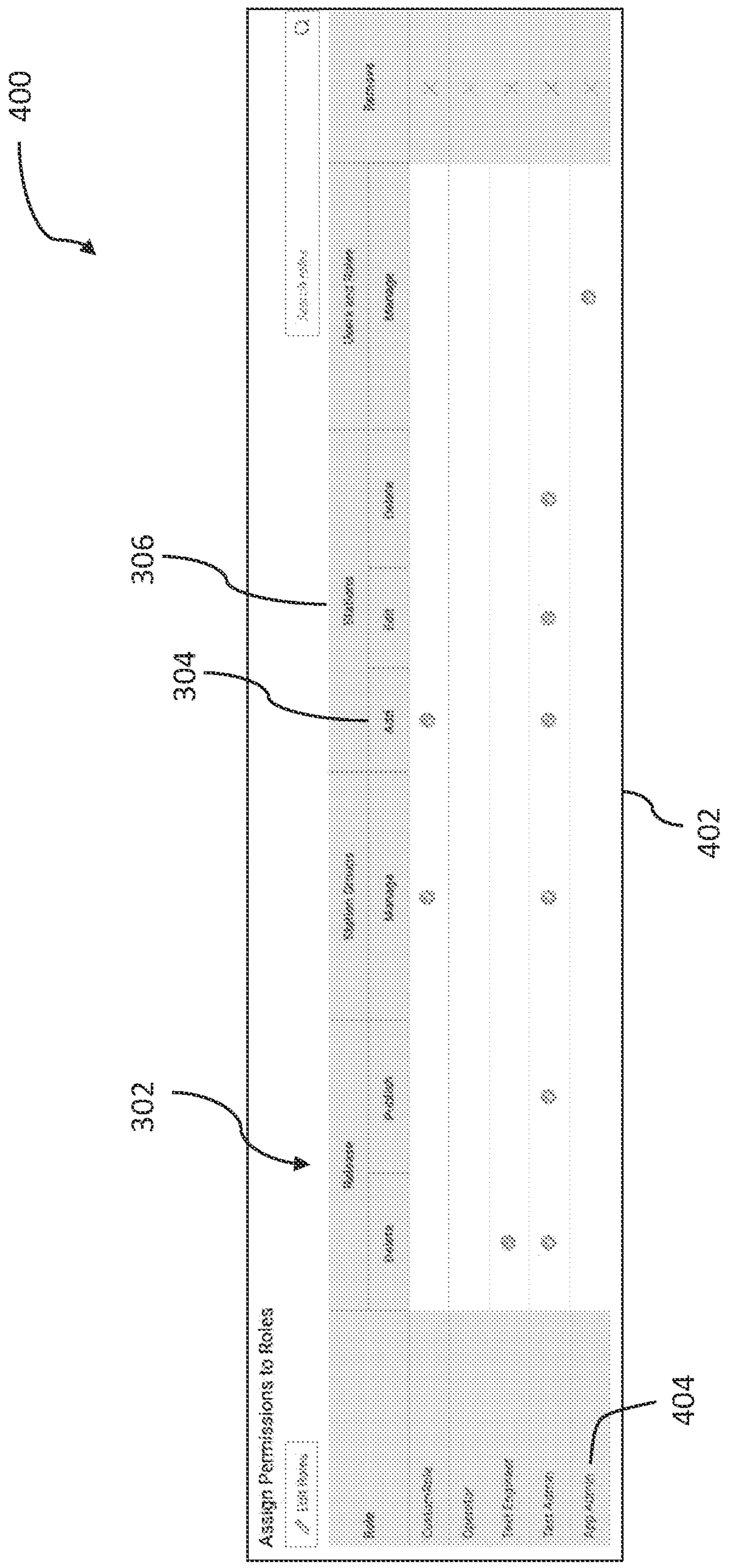
FIG. 4A shows a display for assigning permissions to roles in a permission user interface according to an embodiment of the presently disclosed subject matter.

FIG. 4A shows a display 402 for assigning permissions to roles in a permission user interface 400. In the example shown in FIG. 4A, roles 404 listed in permission user interface 400 include custom role, operator, test engineer, test administrator, and application administrator. Permission user interface 400 contextualizes authorization of users 120 for an administrator to easily view and edit as desired. Permission user interface 400 contextualizes authorization of users 120 for an administrator to easily view and edit permissions as desired. As shown in display 402, role 404 application administration is permitted to manage users and roles and, therefore, may be permitted to add or remove users and reassign roles to users. Permissions to access features 302, listed as non-limiting examples, include delete and publish release; manage station groups; add, edit, and delete stations; and manage users and roles. As shown in FIG. 4A, role 404 may have authorization to access features 302 with a reduced scope 304 to resources 304. For example, role 404 test engineer has authorization to delete a release but not to publish a release.

Figure 4B:
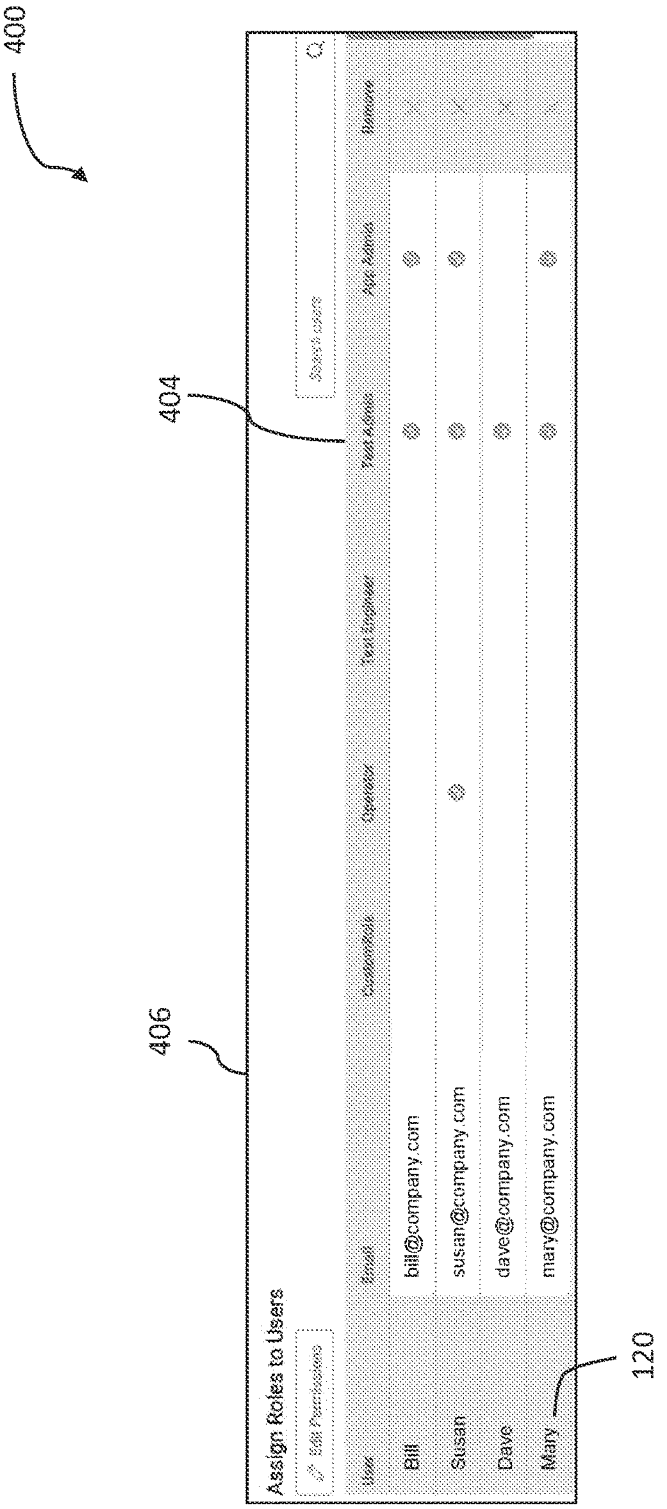
FIG. 4B shows a display for assigning roles to users in a permission user interface according to an embodiment of the presently disclosed subject matter.

FIG. 4B shows a display 406 for assigning roles to users in permission user interface 400. One or more roles 404 may be assigned to each user 120. In some embodiments, users 120 may be assigned a default role 102, such as customer, which an application administrator, such as users 120 Bill, Susan, and Mary, may have permission to revise. Permission user interface 400 provides a simplified interface for an application administrator to easily define roles and corresponding permissions to readily assign roles to users 120. Sub-authorization computing device 102 may receive from permission user interface 400 authorization information of user 120 and update the user's feature access data based on the received authorization information. For example, an application administrator may change role 404 of user 120 Dave from a test administrator to CustomRole, which has fewer permissions. In some embodiments, authorization information, such as changes in roles 404 and/or permissions to access features 302, inputted in permission user interface 400 may be sent to identity provider 112 to update stored authorization status records.

In some embodiments, sub-authorization computing device 102 may be configured to collect data pertaining to features 302 and use of the features 302. For example, sub-authorization computing device 102 may collect metrics for a new feature 302 that is being tested, which may be accessible to all users 120 or only to select users 120. Collected metrics may include the number of users 120 using feature 302, the amount of time users 120 are engaged with the feature, the degree of engagement with the features 120 such as number of clicks or selections pertaining to the feature, and the like. In some embodiments, the data may be pulled and displayed on permission user interface 400.

Identity provider 112 may send an indication of the updated authorization status of user 120 to sub-authorization computing device 102, which the sub-authorization computing device 102 may use to update the feature access data for the user 120. Updating the user's feature access data is particularly important if user 120 has already logged in to the cloud application and is currently accessing the cloud application. In this scenario, sub-authorization computing device 102 would have generated a feature access data that is now outdated and could otherwise grant the user access to features of the cloud application that the user is no longer authorized to access. If permissions for user 120, and thus the features the user 120 is authorized to access, are changed and the user 120 is currently logged in to the cloud application, sub-authorization computing device 102 may automatically generate and send to user interface 108 revised feature access data for user 120 that indicate the permission changes. User interface 108 may then update graphical elements based on the revised feature access data. Permission user interface 400 may auto populate display 402 and display 406 based on feature map 300. When a custodian of the cloud application adds a new feature 302 to feature map 300, permission user interface 400 may automatically add the new feature 302 to display 402. The application administrator, acting as a custodian for the cloud application, may then add new feature 302 to roles 404.

Figure 5A:
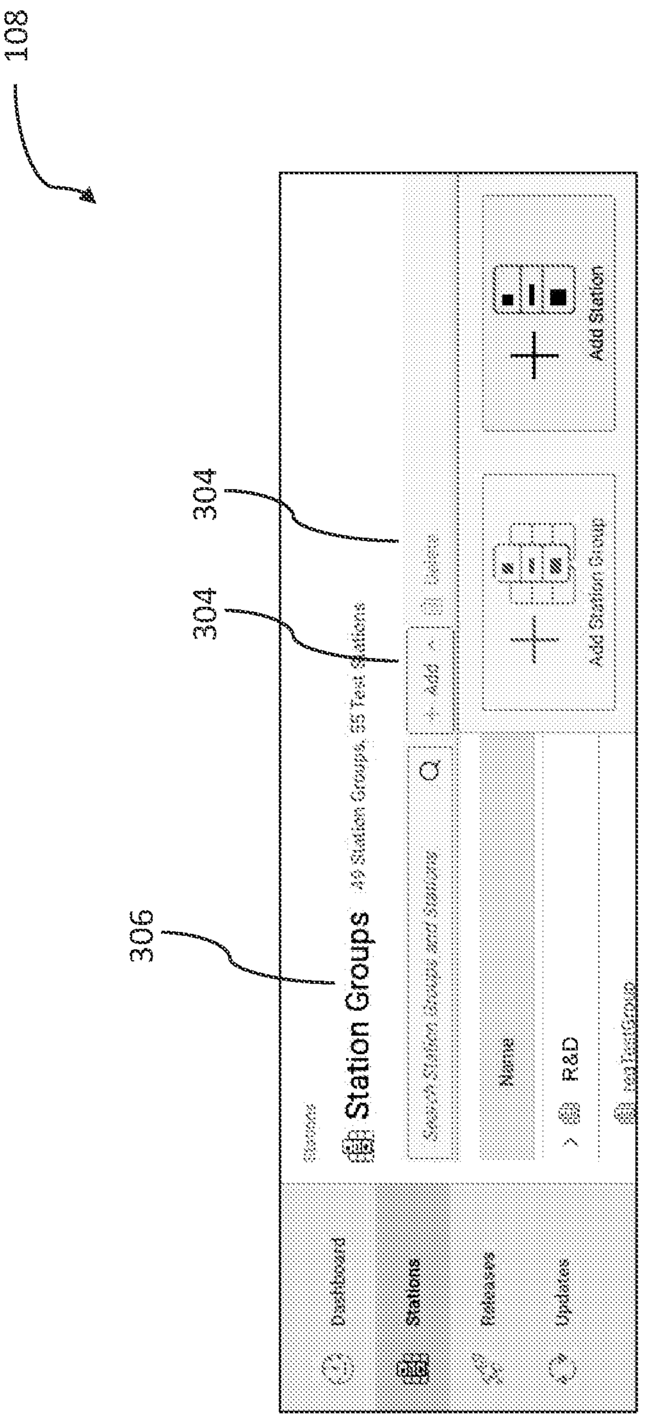
FIG. 5A illustrates graphical elements displayed on a user interface according to an embodiment of the presently disclosed subject matter.
Figure 5B:
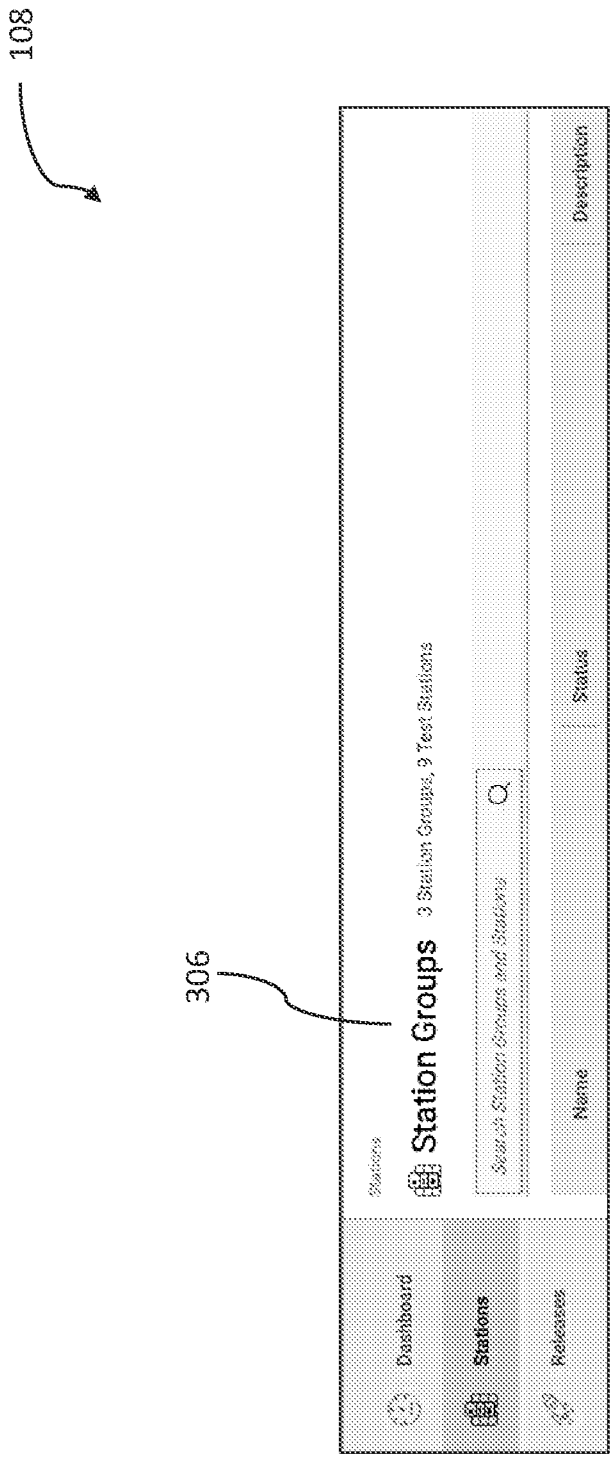
FIG. 5B illustrates graphical elements displayed on a user interface according to an embodiment of the presently disclosed subject matter.

FIGS. 5A and 5B illustrate graphical elements displayed on user interface 108 of the cloud application based on the feature access data received from sub-authorization computing device 102. FIG. 5A includes resource 306 station groups and scopes 304 add and delete, providing access to user 120 to add or delete station groups. User interface 108 may include multiple graphical elements for a feature as demonstrated with an "add" button and an "add station group" button. FIG. 5B shows graphical elements for user 120 who is not authorized to add or delete resource station groups, but the only scope permitted is view. Accordingly, graphical elements in FIG. 5B may include a list of the station groups but may have unauthorized scopes such as add or delete absent in the display.

FIG. 6 shows example feature access data 600 generated by sub-authorization computing device 102 to send to user interface 108. Feature access data 600 may include an indication of which features offered by the cloud application user 120 is permitted to access and which features the user 120 is not authorized to access. For example, the value for features 302 deleteRelease and publishRelease are set as true, identifying that user 120 is authorized to access these features 302 and user interface 108 will display graphical elements for these features. The remaining features 302 listed in feature access data 600 have values false, which identify that user 120 does not have permission to access these features 302.

Figure 7:
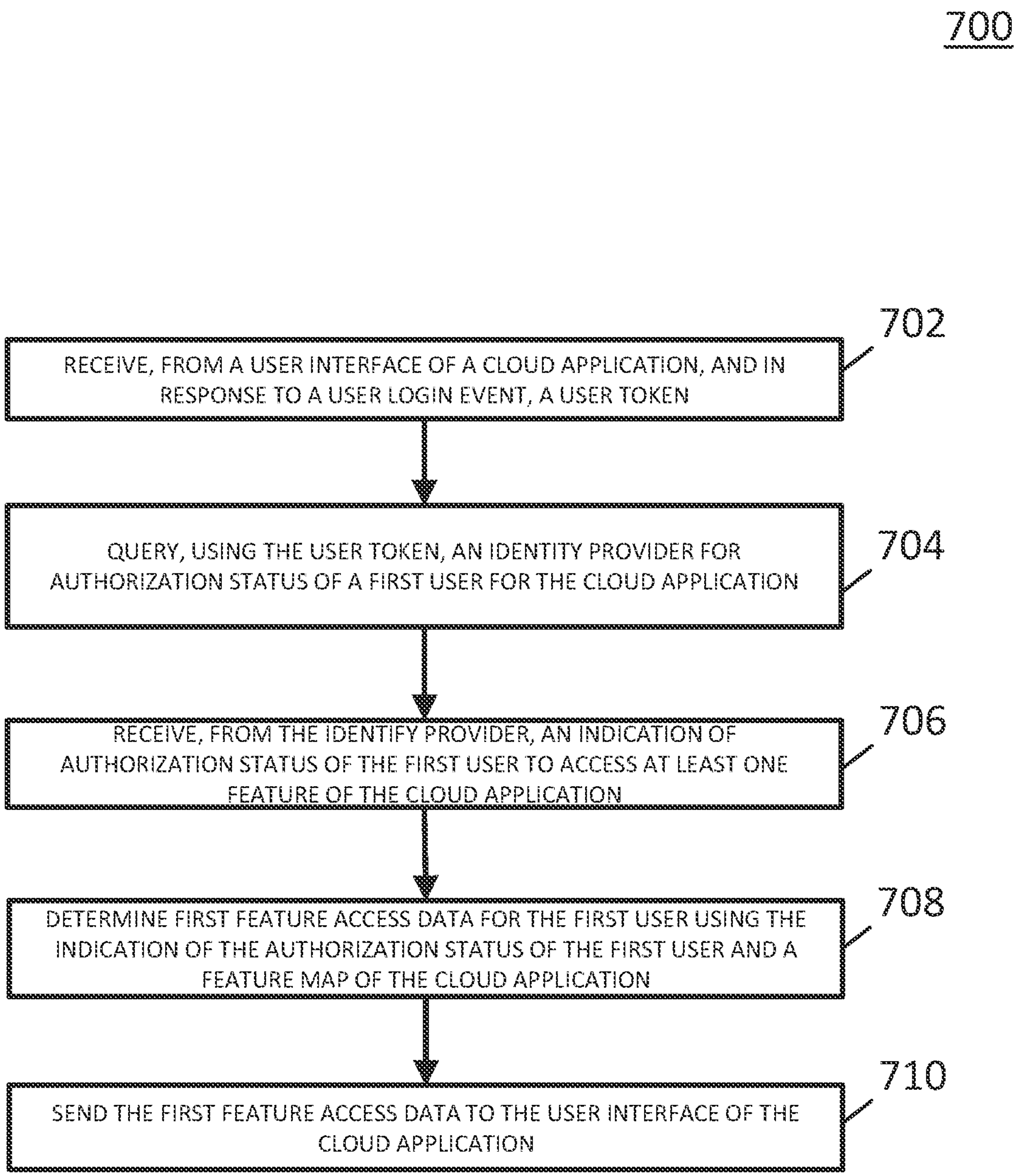
FIG. 7 is a flow diagram illustrating an example method for implementing user authorization in cloud applications according to an embodiment of the presently disclosed subject matter.

FIG. 7 is a flow diagram illustrating an example method 700 for implementing user authorization in cloud applications. At step 702, a sub-authorization computing device receives a user token from a user interface of a cloud application in response to a user login event. The sub-authorization computing device may intercept traffic from the user interface of the cloud application to a backend of the cloud application and identify the user token among the traffic.

At step 704, the sub-authorization computing device queries, using the user token, an identity provider for authorization status of a first user for the cloud application. The sub-authorization computing device may also use features in the feature map to query the identity provider.

At step 706, the sub-authorization computing device receives from the identify provider an indication of authorization status of the first user to access at least one feature of the cloud application. The at least one feature may include at least one resource of the cloud application and at least one scope of access to the corresponding at least one resource. In some embodiments, the sub-authorization computing device may receive a request from a user to access a feature of the cloud application from an API and query the identity provider to determine whether the first user is authorized to access the feature.

At step 708, the sub-authorization computing device determines first feature access data for the first user using the indication of the authorization status of the first user and a feature map of the cloud application. The first feature access data is configured to cause the user interface of the cloud application to display at least one graphical element for enabling the first user to access the at least one feature of the cloud application. The sub-authorization computing device may identify, in the feature map, the at least one feature of the cloud application and associate the at least one feature in the feature map with the corresponding at least one feature in the indication of the authorization status of the first user from the identity provider. The sub-authorization computing device may determine, based on an indication of authorization status of a second user, second feature access data to access at least one feature of the cloud application, wherein the indication of the authorization status of the second user is distinct from the indication of the authorization status of the first user and the second feature access data is distinct from the first feature access data. The second feature access data may be configured to cause the user interface of the cloud application to display at least one graphical element for the second user distinct from the at least one graphical element for the first user.

At step 710, the sub-authorization computing device sends the first feature access data to the user interface of the cloud application. The sub-authorization computing device may send the second feature access data to the user interface of the cloud application.

The sub-authorization computing device may change the authorization status of the first user to access the at least one feature of the cloud application based on administrator instructions. In some embodiments, the sub-authorization computing device may receive, by the identity provider and from a permission user interface, authorization information of the first user and update the first feature access data based on the received authorization information.

Figure 8:
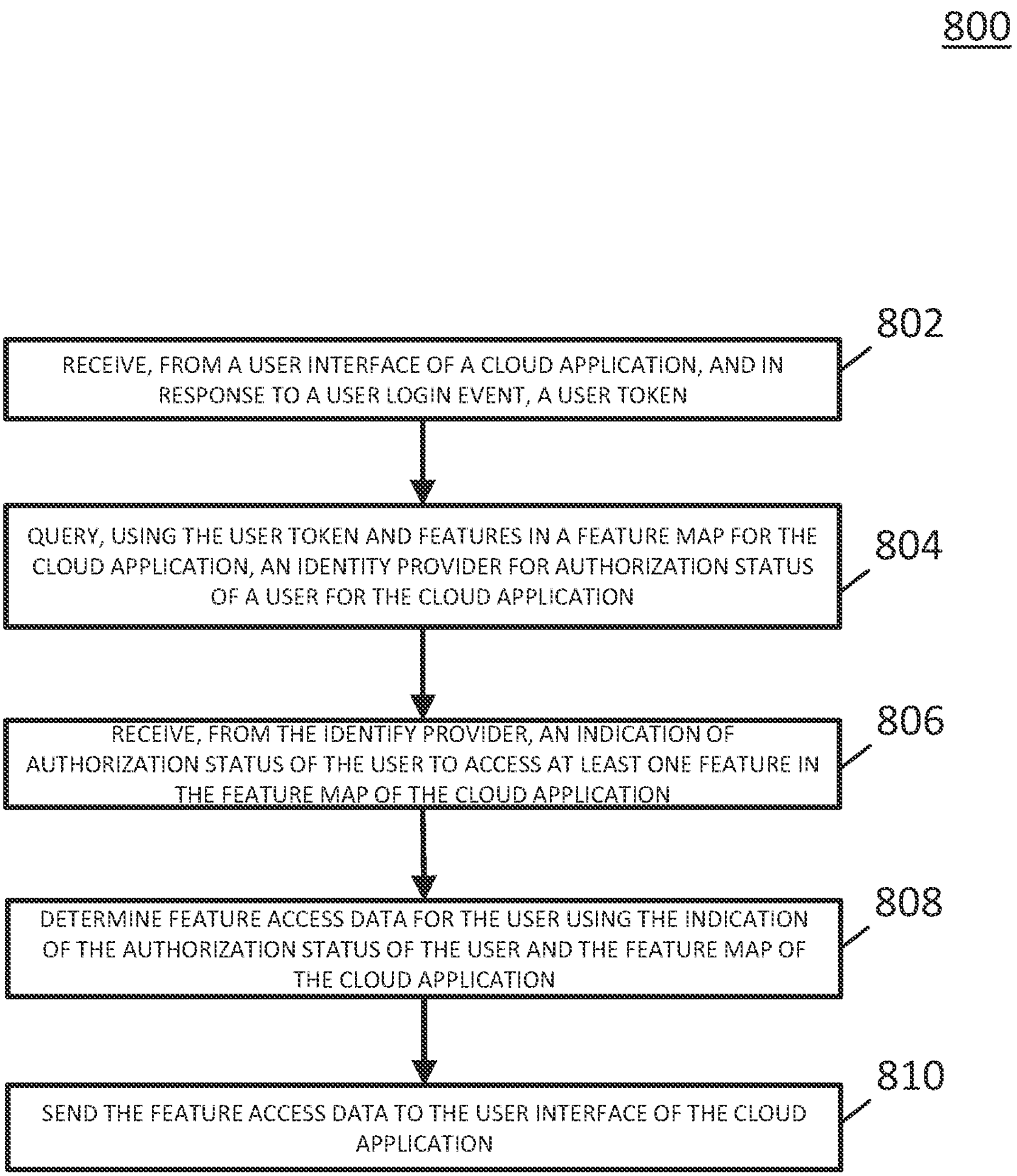
FIG. 8 is a flow diagram illustrating an example method for implementing user authorization in cloud applications according to an embodiment of the presently disclosed subject matter.

FIG. 8 is a flow diagram illustrating example method 800 for implementing user authorization in cloud applications. At step 802, a sub-authorization computing device receives a user token from a user interface of a cloud application in response to a user login event.

At step 804, the sub-authorization computing device queries, using the user token and features in a feature map for the cloud application, an identity provider for authorization status of a user for the cloud application. The sub-authorization computing device may send some or all of the features of the feature map to the identity provider. In some embodiments, the user may already be logged in and requesting to access a specific feature offered by the cloud application, in which sub-authorization computing device may match the requested feature with a corresponding feature in the feature map and query the identity provider using the matched feature in the feature map.

At step 806, the sub-authorization computing device receives, from the identify provider, an indication of authorization status of the user to access at least one feature in the feature map of the cloud application. The indication of authorization status may identify all the features in the feature map that the user is authorized to access and/or all the features in the feature map that the user is not authorized to access.

At step 808, the sub-authorization computing device determines feature access data for the user using the indication of the authorization status of the user and the feature map of the cloud application.

At step 810, the sub-authorization computing device sends the feature access data to the user interface of the cloud application.

Figure 9:
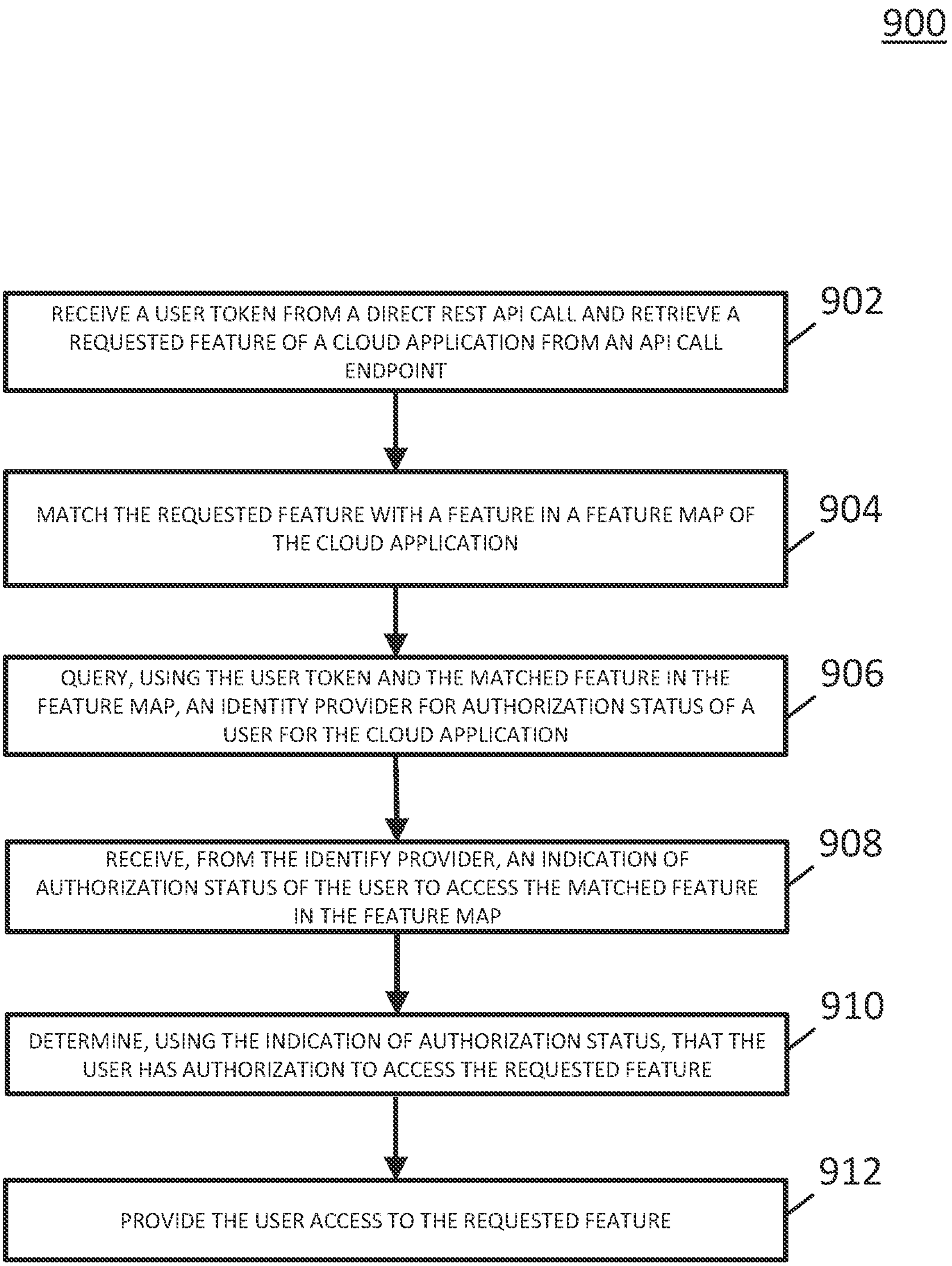
FIG. 9 is a flow diagram illustrating an example method for implementing user authorization in cloud applications according to an embodiment of the presently disclosed subject matter.

FIG. 9 is a flow diagram illustrating example method 900 for implementing user authorization in cloud applications wherein a user bypasses a user interface and accesses a cloud application from an API. At step 900, the sub-authorization computing device receives a user token from a direct REST API call and retrieves a requested feature of a cloud application from an API call endpoint.

At step 904, the sub-authorization computing device matches the requested feature with a feature in a feature map of the cloud application. At step 906, the sub-authorization computing device queries, using the user token and the matched feature in the feature map, an identity provider for authorization status of a user for the cloud application.

At step 908, the sub-authorization computing device receives from the identify provider, an indication of authorization status of the user to access the matched feature in the feature map. The indication of authorization status may include an indication of authorization status of the user to access the requested feature.

At step 910, the sub-authorization computing device determines, using the indication of authorization status, that the user has authorization to access the requested feature. At step 912, the sub-authorization computing device provides the user access to the requested feature. The sub-authorization computing device may push the REST API call to the API call endpoint to access the feature from the cloud application microservices.

It will be appreciated that methods 700, 800, and 900 are for illustrative purposes and that different and/or additional actions may be used. It will also be appreciated that various actions described herein may occur in a different order or sequence. It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for implementing user authorization in cloud applications, the method comprising:

receiving, at a sub-authorization computing device from a user interface of a cloud application, and in response to a user login event, a user token;

querying, by the sub-authorization computing device and using the user token, an identity provider for authorization status of a first user for the cloud application;

receiving, at the sub-authorization computing device from the identify provider, an indication of authorization status of the first user to access at least one feature of the cloud application;

determining, by the sub-authorization computing device, first feature access data for the first user using the indication of the authorization status of the first user and a feature map of the cloud application, the first feature access data being configured to cause the user interface of the cloud application to display at least one graphical element for enabling the first user to access the at least one feature of the cloud application, wherein the at least one feature comprises a new feature of the cloud application that is being tested by a selected group of users, wherein the feature map of the cloud application lists a plurality of resources of the cloud application and scopes, wherein the scopes define actions allowed to be performed on the resources, and wherein the feature map is editable to assign a role of test engineer to the users in the selected group of users and editable to assign permissions associated with release of the at least one feature to the role of test engineer; and sending, by the sub-authorization computing device to the user interface of the cloud application, the first feature access data;

at the cloud application, allowing the user to access features of the cloud application identified by the first feature access data;

while the user is logged in to the cloud application:

receiving, by the sub-authorization computing device, an indication of an updated authorization status of the user;

generating, by the sub-authorization computing device, revised feature access data for the user indicating permission changes for the user;

sending, by the sub-authorization computing device and to the cloud application user interface, the revised feature access data for the user; and updating, by the cloud application user interface, graphical elements that indicate the permission changes.

2. The method of claim 1 comprising querying an identity provider for authorization status of a first user for the cloud application using features in a feature map.

3. The method of claim 1 wherein determining the first feature access data for the first user comprises:

identifying, by the sub-authorization computing device and in the feature map, the at least one feature of the cloud application; and associating, by the sub-authorization computing device, the at least one feature in the feature map with the corresponding at least one feature in the indication of the authorization status of the first user from the identity provider.

4. The method of claim 1 comprising changing, by the sub-authorization computing device, the authorization status of the first user to access the at least one feature of the cloud application based on administrator instructions.

5. The method of claim 1 comprising receiving, by the sub-authorization computing device and from the first user, a request to access a feature of the cloud application from an application programming interface (API), matching the requested feature with a corresponding feature in a feature map, and querying the identity provider to determine whether the first user is authorized to access the requested feature using the user token and the matched feature in the feature map.

6. The method of claim 1 wherein receiving the user token in response to the login event comprises:

intercepting, by the sub-authorization computing device, traffic from the user interface of the cloud application to a backend of the cloud application; and identifying, by the sub-authorization computing device, a user token among the traffic.

7. The method of claim 1 comprising determining, by the sub-authorization computing device and based on an indication of authorization status of a second user, second feature access data to access at least one feature of the cloud application, wherein the indication of the authorization status of the second user is distinct from the indication of the authorization status of the first user and the second feature access data is distinct from the first feature access data.

8. The method of claim 7 wherein the second feature access data is configured to cause the user interface of the cloud application to display at least one graphical element for the second user distinct from the at least one graphical element for the first user.

9. A system for implementing user authorization in cloud applications, the system comprising:
- a processor;
- a memory communicatively connected to the processor; and
- a sub-authorization computing device implemented using the processor and the memory, wherein the sub-authorization computing device is configured for:
- receiving, from a user interface of a cloud application, and in response to a user login event, a user token;
- querying, using the user token, an identity provider for authorization status of a first user for the cloud application;
- receiving, from the identify provider, an indication of authorization status of the first user to access at least one feature of the cloud application;
- determining first feature access data for the first user using the indication of the authorization status of the first user and a feature map of the cloud application, the first feature access data being configured to cause the user interface of the cloud application to display at least one graphical element for enabling the first user to access the at least one feature of the cloud application, wherein the at least one feature comprises a new feature of the cloud application that is being tested by a selected group of users, wherein the feature map of the cloud application lists a plurality of resources of the cloud application and scopes, wherein the scopes define actions allowed to be performed on the resources, and wherein the feature map is editable to assign a role of test engineer to the users in the selected group of users and editable to assign permissions associated with release of the at least one feature to the role of test engineer;
- sending the first feature access data to the user interface of the cloud application;
- at the cloud application, allowing the user to access features of the cloud application identified by the first feature access data; and
- while the user is logged in to the cloud application:
  - receiving, by the sub-authorization computing device, an indication of an updated authorization status of the user;
  - generating, by the sub-authorization computing device, revised feature access data for the user indicating permission changes for the user;
  - sending, by the sub-authorization computing device and to the cloud application user interface, the revised feature access data for the user; and
  - updating, by the cloud application user interface, graphical elements that indicate the permission changes.

10. The system of claim 9 wherein determining the first feature access data for the first user comprises:
- identifying, in the feature map, the at least one feature of the cloud application; and
- associating the at least one feature in the feature map with the corresponding at least one feature in the indication of the authorization status of the first user from the identity provider.

11. The system of claim 9 wherein the sub-authorization computing device is configured for changing the authorization status of the first user to access the at least one feature of the cloud application based on administrator instructions.

12. The system of claim 9 wherein the sub-authorization computing device is configured for receiving, from the first user, a request to access a feature of the cloud application from an application programming interface (API), matching the requested feature with a corresponding feature in a feature map, and querying the identity provider to determine whether the first user is authorized to access the requested feature using the user token and the matched feature in the feature map.

13. The system of claim 9 wherein receiving the user token in response to the login event comprises:
- intercepting traffic from the user interface of the cloud application to a backend of the cloud application; and
- identifying a user token among the traffic.

14. The system of claim 9 wherein the sub-authorization computing device is configured for querying an identity provider for authorization status of a first user for the cloud application using features in a feature map.

15. The system of claim 9 wherein the sub-authorization computing device is configured for determining, based on an indication of authorization status of a second user, second feature access data to access at least one feature of the cloud application, wherein the indication of the authorization status of the second user is distinct from the indication of the authorization status of the first user and the second feature access data is distinct from the first feature access data.

16. The system of claim 15 wherein the second feature access data is configured to cause the user interface of the cloud application to display at least one graphical element for the second user distinct from the at least one graphical element for the first user.

17. A non-transitory computer readable medium having stored thereon executable instructions that when executed by at least one processor of at least one computer cause the at least one computer to perform steps comprising:
- receiving, from a user interface of a cloud application, and in response to a user login event, a user token;
- querying, using the user token, an identity provider for authorization status of a first user for the cloud application;
- receiving, from the identify provider, an indication of authorization status of the first user to access at least one feature of the cloud application;
- determining first feature access data for the first user using the indication of the authorization status of the first user and a feature map of the cloud application, the first feature access data being configured to cause the user interface of the cloud application to display at least one graphical element for enabling the first user to access the at least one feature of the cloud application, wherein the at least one feature comprises a new feature of the cloud application that is being tested by a selected group of users, wherein the feature map of the cloud application lists a plurality of resources of the cloud application and scopes, wherein the scopes define actions allowed to be performed on the resources, and wherein the feature map is editable to assign a role of test engineer to the users in the selected group of users and editable to assign permissions associated with release of the at least one feature to the role of test engineer;
- sending the first feature access data to the user interface of the cloud application;

at the cloud application, allowing the user to access features of the cloud application identified by the first feature access data; and while the user is logged in to the cloud application:

receiving, by the sub-authorization computing device, an indication of an updated authorization status of the user;

generating, by the sub-authorization computing device, revised feature access data for the user indicating permission changes for the user;

sending, by the sub-authorization computing device and to the cloud application user interface, the revised feature access data for the user; and updating, by the cloud application user interface, graphical elements that indicate the permission changes.

18. The medium of claim 17, the steps comprising receiving, from the first user, a request to access a feature of the cloud application from an application programming interface (API) and querying the identity provider to determine whether the first user is authorized to access the feature.

* * * * *